(12) United States Patent
Kramer et al.

(10) Patent No.: US 9,565,173 B2
(45) Date of Patent: Feb. 7, 2017

(54) SYSTEMS AND METHODS FOR ESTABLISHING TRUSTED, SECURE COMMUNICATIONS FROM A MOBILE DEVICE TO A MULTI-FUNCTION DEVICE

(71) Applicant: XEROX CORPORATION, Norwalk, CT (US)

(72) Inventors: Roger T. Kramer, Rochester, NY (US); Gavan L. Tredoux, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 319 days.

(21) Appl. No.: 13/850,540

(22) Filed: Mar. 26, 2013

(65) Prior Publication Data
US 2014/0298014 A1    Oct. 2, 2014

(51) Int. Cl.
*H04L 29/06* (2006.01)
*G06F 21/35* (2013.01)
*G06F 21/57* (2013.01)

(52) U.S. Cl.
CPC .............. *H04L 63/08* (2013.01); *G06F 21/35* (2013.01); *G06F 21/57* (2013.01); *H04L 63/061* (2013.01); *H04L 63/18* (2013.01); *H04L 63/0492* (2013.01)

(58) Field of Classification Search
CPC combination set(s) only.
See application file for complete search history.

(56) References Cited

U.S. PATENT DOCUMENTS

| 2004/0003250 | A1* | 1/2004 | Kindberg | G06F 21/445 713/171 |
| 2004/0104268 | A1* | 6/2004 | Bailey | G06Q 20/32 235/439 |
| 2006/0083404 | A1* | 4/2006 | Shimosato | H04N 1/00363 382/100 |
| 2012/0130905 | A1* | 5/2012 | Tsudik | H04W 12/06 705/75 |
| 2012/0138693 | A1* | 6/2012 | Litz | G06K 7/1095 235/494 |
| 2012/0287460 | A1* | 11/2012 | McMillin | H04N 1/00204 358/1.15 |

(Continued)

OTHER PUBLICATIONS

Bianchi et al., Using Mobile Device Screens for Authentication, © 2011, ACM, 4 pages.*

(Continued)

*Primary Examiner* — Jeffrey Pwu
*Assistant Examiner* — Baotram Tran
(74) *Attorney, Agent, or Firm* — MH2 Technology Law Group LLP

(57) ABSTRACT

The present invention generally relates to systems and methods for establishing trusted, secure communications from a mobile device, such as a smart phone, to an immobile device, such as a multi-function device. The disclosed techniques can include the immobile device displaying a pattern that encodes a cryptographic key. The mobile device can obtain an image of the pattern and decode it to obtain the cryptographic key. Because the mobile device obtained the image within its line-of-sight, for example, it can be assured that it communicated with the immobile device, and only the immobile device. The mobile device and the immobile device can use the cryptographic key to secure further communications.

7 Claims, 1 Drawing Sheet

(56) References Cited

U.S. PATENT DOCUMENTS

| | | | | |
|---|---|---|---|---|
| 2012/0308003 A1* | 12/2012 | Mukherjee | ............... | G09C 5/00 380/243 |
| 2013/0007464 A1* | 1/2013 | Madden | .............. | G06F 21/6218 713/179 |
| 2013/0194075 A1* | 8/2013 | Dressel | .............. | G06K 19/0723 340/10.1 |
| 2013/0247117 A1* | 9/2013 | Yamada | ................. | G08C 17/02 725/93 |
| 2014/0040941 A1* | 2/2014 | Rosenberg | ............. | G06Q 20/32 725/28 |
| 2014/0120905 A1* | 5/2014 | Kim | ................... | G07C 9/00857 455/426.1 |

OTHER PUBLICATIONS

Claycomb et al., Secure Device Pairing Using Audio, © 2009, IEEE, 8 pages.*

Fang et al., Securing Interactive Sessions Using Mobile Device through Visual Channel and Visual Inspection, © 2010, ACM, 10 pages.*

Garriss et al., Trustworthy and Personalized Computing on Public Kiosks, © 2008, ACM, 12 pages.*

Hao et al., COBRA: Color Barcode Streaming for Smartphone Systems, © 2012, ACM, 13 pages.*

Xuechen et al., LED display screen monitoring platform based on identity authentication with USBKey, © 2012, IEEE, 5 pages.*

Zhu et al., Print Signatures for Document Authentication, © 2003, ACM, 10 pages.*

A. Incze, Pixel Sieve method for secret sharing & visual cryptography, © 2010, IEEE, 6 pages.*

* cited by examiner

SYSTEMS AND METHODS FOR ESTABLISHING TRUSTED, SECURE COMMUNICATIONS FROM A MOBILE DEVICE TO A MULTI-FUNCTION DEVICE

FIELD OF THE INVENTION

This invention relates generally to establishing secure communications between an immobile device and a mobile device.

BACKGROUND OF THE INVENTION

Many techniques for authenticating a mobile device (e.g., a smart phone) to an immobile device (e.g., a multi-function device) exist. However, techniques that allow the immobile device to establish that a user of the mobile device is who he claims to be do not necessarily establish a trust relationship from the immobile device to the mobile device. In other words, some techniques do not permit the mobile device to establish that it is communicating over a network connection with the intended immobile device and only that immobile device, rather than, for example, a malevolent device configured to spoof the intended immobile device. The user of the mobile device also desires assurance that his communications to the immobile device are safe from, e.g., man-in-the-middle and eavesdropping attacks. Often public key infrastructure ("PKI") is used to establish security and a chain of trust between devices. However, PKI and other such techniques require a trusted third party. Further, such techniques must be properly implemented to provide the desired trust, but some implementations use self-signed certificates for cost and administrative reasons, thereby omitting the trust that would have been provided by the trusted third party.

SUMMARY

According to an embodiment, a method for establishing trusted secure communications from a first device to a second device is presented. The method includes providing, by the second device, data encoding a cryptographic key, where the data is provided by one of a visual display, direct electrical contact, and proximity-based communications, such that the first device can decode the data to obtain the cryptographic key, receiving, from the first device, a communication including at least one datum encrypted using the cryptographic key, decrypting the communication to obtain the at least one datum, and performing an action based on the communication.

According to an embodiment a method for establishing trusted secure communications from a mobile device to a multi-function device is presented. The method includes providing, by the multi-function device, a visual pattern encoding a cryptographic key, such that the mobile device can locally obtain at least one image of the visual pattern, such that the mobile device can decode the visual pattern to obtain the cryptographic key, receiving, from the mobile device, a communication including at least one datum encrypted using the cryptographic key, decrypting the communication to obtain the at least one datum, and performing an action based on the communication.

Various optional features of the above method include the following. The cryptographic key can be a symmetric key. The cryptographic key can be an asymmetric key. The providing can include displaying the visual pattern on a display of the multi-function device. The providing can include the multi-function device printing the visual pattern onto paper. The visual pattern can include a pattern such as a one-dimensional bar code or a two-dimensional bar code. The visual pattern can include a dynamic display encoding the encryption key at least partially in a time domain. The action can include establishing a secure wireless TCP/IP channel with the mobile device based on the cryptographic key. The action can include printing a document stored on the mobile device, or scanning a document to the mobile device. The method can further include discarding the cryptographic key at the end of a communication session with the mobile device.

According to some implementations, a multi-function device configured to establish trusted secure communications from a mobile device is presented. The multi-function device includes means for displaying a visual pattern encoding a cryptographic key, such that the mobile device can locally obtain at least one image of the visual pattern, such that the mobile device can decode the visual pattern to obtain the cryptographic key, an interface configured to receive, from the mobile device, a communication including at least one datum encrypted using the cryptographic key, and at least one processor configured to decrypt the communication to obtain the at least one datum.

Various optional features of the above multi-function device can include the following. The cryptographic key can be a symmetric key. The cryptographic key can be an asymmetric key. The means for displaying can include a display of the multi-function device. The means for displaying can include a printer of the multi-function device. The visual pattern can include a one-dimensional bar code or a two-dimensional bar code. The means for displaying can include a dynamic display configured to encode the encryption key at least partially in a time domain. The multi-function device can be further configured to establishing a secure wireless TCP/IP channel with the mobile device based on the cryptographic key. The multi-function device can be further configured to print a document stored on the mobile device or scan a document to the mobile device.

BRIEF DESCRIPTION OF THE DRAWINGS

Various features of the embodiments can be more fully appreciated, as the same become better understood, with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several, implementations, such feature may be combined with one or more other features of the other implementations as may be desired and advantageous for any given or particular function. Furthermore to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Figure 1:
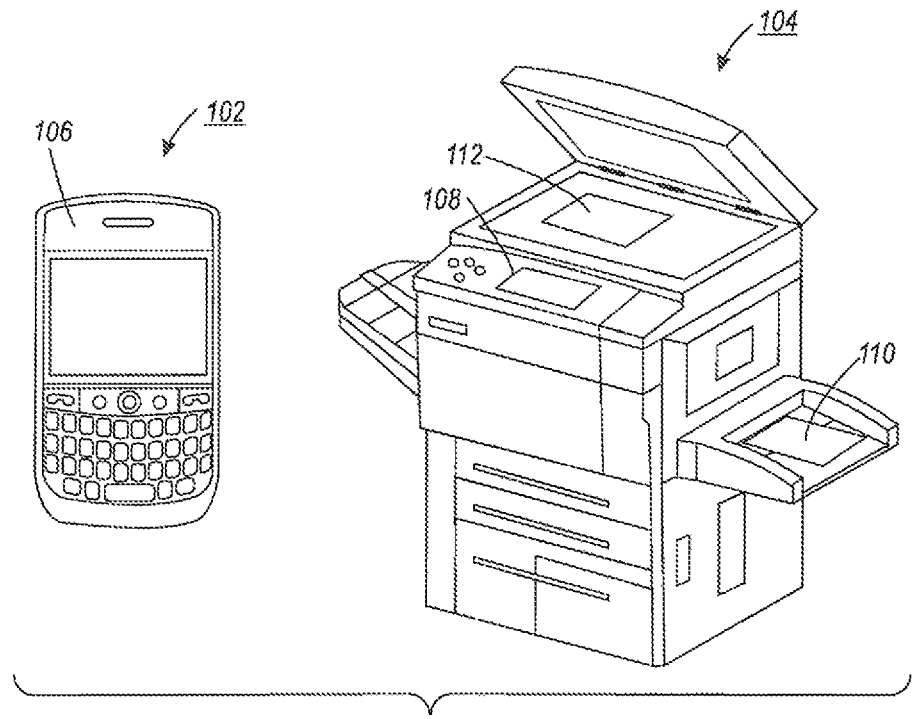
FIG. 1 is a schematic diagram of a system according to some embodiments.

FIG. 1 is a schematic diagram of a system according to some embodiments. The system includes mobile device 102 and immobile device 104.

Mobile device 102 can be for example, a smart telephone. Mobile device 102 can include a persistent memory, a volatile memory, and one or more processors capable of executing program instructions to at least partially implement the techniques disclosed herein.

Mobile device further includes a camera 106. Camera 106 can include, e.g., a fixed focus lens. Camera 106 in general is capable of capturing an image of objects within its field of view and storing an electronic representation of such image in any of a variety of formats, e.g., bitmap, JPEG, GIF, etc. Camera 106 can further be capable of capturing moving pictures, that is, movies, and storing such movies, in any of a variety of formats, e.g., MPEG, FLASH, etc.

Mobile device 102 is capable of identifying and decoding patterns in images captured by camera 106. Types of patterns that mobile device 102 can capture and decode include one-dimensional and two-dimensional bar codes. Such patterns can be formatted according to any of a variety of standards, e.g., QR codes, UPC codes, etc. Information can be encoded in patterns by shapes, in black and white, and/or in color. Regardless as to the type of encoding used, mobile device 102 is capable of isolating pattern from images captured by camera 106 and decoding the patterns to obtain the information encoded therein using known techniques. Mobile device 102 can thereby obtain information in any of a variety of formats, e.g., bits, bytes, ASCII text, etc.

Mobile device 106 can further include an interface capable of establishing and maintaining communications wirelessly. Such an interface can comply with a variety of standards, e.g., 802.11a, 802.11n, etc. Using the interface, mobile device 102 can communicate using any of a variety of standards, e.g., TCP/IP, HTTPS, etc.

Mobile device 102 can include a port capable of establishing a wireline connection. The port can accept a cable and/or cradle for charging mobile device 102 and/or establishing bi-directional communications conforming to a variety of standards, e.g., TCP/IP, etc.

In some implementations, mobile device includes a radio-frequency interface for proximity-based communications. Such an interface can comply with any of a variety of standards, e.g. NFC, standards for RFID, etc.

Mobile device 102 can further include a speaker and microphone. The speaker can be configured to produce sounds based on data stored in, or received by, mobile device 102. The microphone can be configured to capture sounds present near mobile device 102 and store digital representations thereof. Sound received by and/or stored in mobile device 102 can be in any of a variety of formats, e.g., WAV, MP3, MP4, etc.

In some implementations, mobile device can be, for example, a tablet computer.

Immobile device 104 can be, for example, a multi-function device. In general, a "multi-function device" for purposes of this document is an immobile device capable of printing onto paper and scanning paper immobile device 104 as depicted in FIG. 1 thus includes a scan bed 112. Scan bed 112 is capable of receiving paper, which immobile device 104 can scan to create and store a digital image. Immobile device 104 can store the digital image in any of a variety of formats, e.g., bitmap, JPEG, GIF, PDF, etc. Immobile device 104 is further capable of printing paper documents to paper tray 110. In some implementations, immobile device 104 can receive requests to print paper documents, e.g., from a computer; that is, in some implementations, immobile device can include network printing capabilities. In some implementations, immobile device 104 can print copies of documents its scans using scan bed 112; that is, in some implementations, immobile device 104 can include copying capabilities.

Immobile device 104 further includes display 108. Display 108 is capable of displaying images. Thus display 108 can be, e.g., an LCD display (backlit or not backlit), a plasma display, an LED display, etc. In some implementations, display 108 is capable of showing hi-resolution images. In other implementations, display 108 is a simple collection of one or more lights, e.g., LCD lights.

Display 108 is capable of showing patterns that encode information. Such patterns can be one-dimensional and two-dimensional bar codes, formatted according to any of a variety of standards, e.g., QR codes, UPC codes, etc. information can be encoded in patterns by shapes, in black and white, and/or in color. Regardless as to the type of encoding used, immobile device 104 is capable of encoding information into patterns and showing such patterns using display 108.

Immobile device 104 further includes cryptographic processing capabilities. Thus, immobile device 104 can generate cryptographic parameters, such as cryptographic keys. Immobile device 104 can include a random or pseudo-random number generator for this purpose. Immobile device 104 can implement cryptographic algorithms, including symmetric algorithms and asymmetric algorithms, to encrypt and decrypt data. Example algorithms include, e.g., AES, Triple-DES, Diffie-Hellman, RSA, etc.

In some implementations, immobile device 104 includes a wireline and/or wireless network interface. Such an interface can comply with a variety of standards, e.g., 802.11a, 802.11n, etc. Using the interface, immobile device 104 can communicate using any of a variety of standards, e.g., TCP/IP, HTTPS, etc.

In some implementations, immobile device 104 includes a cradle or cable capable of establishing a direct electrical connection with mobile device 102. Such a connection can be used to transfer data in both directions according to any of a variety of standards, e.g., TCP/IP, etc.

In some implementations, immobile device 104 can be a kiosk. In such implementations, immobile device 104 can vend various data, e.g., MP3 audio files. To that end, immobile device 104 can include an input device, such as a keypad or touchscreen. In some implementations, the touchscreen can be implemented as part of display 108. Immobile device 104 can accept payment information for the data it vends.

In some implementations immobile device 104 can be an information-providing station. In such implementations, immobile device 104 can receive and/or supply, e.g., medical records of patients and be located in a hospital or similar facility.

Figure 2:
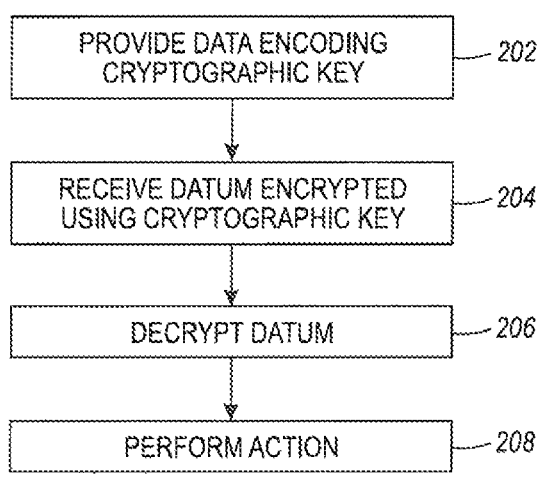
FIG. 2 is a flowchart of a method according to some embodiments.

FIG. 2 is a flowchart of a method according to some embodiments. The method of FIG. 2 can be implemented using mobile device 102 and immobile device 104 of FIG. 1. The method of FIG. 1 allows mobile device 102 to establish a trusted, secure communication session with immobile device 104.

At block 202, immobile device 104 provides data encoding a cryptographic key to mobile device 102 in a manner that ensures that a user of mobile device can be assured that mobile device 102 receives the data only from immobile device 104. To do this, immobile device 104 generates or otherwise obtains a cryptographic key. In some embodiments, before providing the data, immobile device 104 encrypts the key using a cryptographic scheme that immobile device is capable of decrypting (e.g., shared symmetric keys, possession of conjugate asymmetric keys). Immobile device 104 then provides the data encoding the cryptographic key (whether encrypted or not) in any of several forms.

In some implementations, immobile device 104 displays a visual pattern encoding the cryptographic key in the spatial domain on display 108. Such a pattern can be e.g., a one-dimensional or two-dimensional bar code (e.g., UPC, QR, etc.). In some embodiments, the pattern encodes information in the spatial domain as well as the color domain. Mobile device 102 uses camera 106 to obtain an image of the displayed pattern. Using known techniques, mobile device 102 isolates the pattern from the image and decodes the pattern to obtain a copy of the cryptographic key, decrypting it if necessary.

In some implementations, immobile device 104 prints a visual pattern on paper to paper tray 110. The visual pattern encodes the cryptographic key in the spatial domain as described immediately above. Mobile device can capture an image of the pattern and decode it to obtain a copy of the cryptographic key as discussed immediately above.

In some implementations, immobile device 104 displays a sequence of visually perceptible modulations to provide the cryptographic key encoded in the time domain. Immobile device can use e.g., display 108 to that end, or use a dedicated LED or other light-emitting instrumentality. The modulation can be any type of modulation, e.g., Morse code, etc. Mobile device 102 uses camera 106 to obtain a series of images of the modulated information. Mobile device then decodes the modulated information to obtain a copy of the cryptographic key, decrypting it if necessary.

In some implementations, immobile device 104 provides the cryptographic key using proximity-based communications. Such communications can be implemented using, e.g., an NFC standard. In some implementations such communications can be attained using an RFID standard. Mobile device thus obtains a copy of the cryptographic key, which it can decrypt if necessary.

In some implementations, immobile device 104 completes an electrical connection with immobile device 102 in order to transfer the data. The electrical connection can be obtained by connecting a cable to mobile device 102, or by docking mobile device 102 on a cradle on immobile device 104. The communication can be by way of any direct-connection protocol, e.g., RS-232. In this manner, mobile device 102 obtains a copy of the cryptographic key.

In some implementations, immobile device 104 provides an audio signal modulated with data representing the cryptographic key. The audio signal can be supplied by a speaker of immobile device 104. Mobile device 102 can utilize a microphone to capture the audio signal, and demodulate it to obtain a copy of the key.

Thus, at the end of block 202, immobile device has made data encoding a cryptographic key available to mobile device 102 in a manner that ensures physical proximity, physical connection, line-of-site, or hearing range between mobile device 102 and immobile device 104. Mobile device 102 obtains a copy of the cryptographic key. If needed, mobile device 102 can decrypt the received data to obtain a copy of the cryptographic key.

At block 204, immobile device 104 receives a communication from mobile device 102. The communication can be through any of a number of communication channels. In some implementations, wireless communication is used, e.g., based on 802.11a or 802.11n standards. In some implementations, the communication itself establishes a secure communication channel between mobile device 102 and immobile device 104 based on the cryptographic key. Such a communication channel can be formed according to any, or a combination, of TCP/IP, HTTPS, 802.11a and 802.11n.

The communication includes at least one datum that mobile device 102 encrypted using the cryptographic key. The datum can be a random number generated by mobile device 102, for example. In some implementations, the datum is an identification of the mobile device. In some implementations, the datum is supplied by immobile device 104 at the same time and in the same manner that immobile device 104 provided the cryptographic key.

At block 206, immobile device 104 decrypts the datum it received at block 204. If immobile device 104 sent a copy of a public key as part of an asymmetric cryptographic scheme at block 204, then it uses the conjugate private key to decrypt the datum at block 206. If immobile device 104 sent a copy of a secret key as part of a symmetric cryptographic scheme at block 204, then it uses the same secret key to decrypt the datum at block 206. Thus, immobile device obtains a copy of the datum sent by mobile device 102.

At this point, immobile device can perform various authentication checks according to some implementations. For example, if mobile device 102 obtained the datum it encrypted from immobile device 104, then at block 206, immobile device can confirm that the datum it receives matches the datum it supplied.

At block 208, immobile device 104 performs an action. The action may be based on the communication it received, for example, the action might utilize an additional communication from mobile device 102 to immobile device 104, where the communication was encrypted using the cryptographic key supplied at block 202. Such a communication can be based on any of a variety of standards, e.g., HTTPS. The communication itself can specify the action performed according to block 208. In some implementations, immobile device 104 performs the action once it decrypts the datum without awaiting additional communications from mobile device 102.

In some implementations, the action of block 208 is establishing a secure channel between mobile device 102 and immobile device 104 based on the supplied cryptographic key. The secure communication channel can be formed according to a TCP/IP standard or other equivalent network protocol.

In implementations where immobile device 104 is a multi-function device, the action can be printing a document sent from mobile device 102 using, e.g., an 802.11 standard. The document can be sent as an additional communication as discussed above, and, in some implementations, can be encrypted for transfer. In such implementations, immobile device 104 can print the document it receives without awaiting further commands.

In implementations where immobile device 104 is a multi-function device, the action can be sending (e.g., via an 802.11 standard) a scanned document to mobile device 102. In such implementations, a user can place a document on scan bed 112, then activate mobile device 102 to initiate the scanning an document transfer. In some implementations, the scanned document can be encrypted for transfer to mobile device 102.

In implementations in which immobile device 104 is a kiosk vending data, e.g., MP3 audio files, the action can be an exchange of payment information for the vended data. Thus, immobile device 102 can supply payment information using an encrypted communication channel based on the cryptographic key provided at block 202 and receive a copy of the vended data on that or a different channel.

In implementations where immobile device is an information-providing station, e.g., situated in a hospital, the action of block 208 can be conveying a medical record from mobile device 102 to immobile device 104, or from immobile device 104 to mobile device 102. The medical record can be encrypted using the key provided at block 202, or using a different key.

At the end of the method of FIG. 2, mobile device 102 and/or immobile device 104 can discard the key provided at block 202. Thus, in some implementations, the provided key can be a single-use key, whether it be a symmetric key or an asymmetric key. In other implementations, the devices 104, 104 retain a copy of the key for future use, e.g., future communications.

While example embodiments have been described herein in relation to a mobile device and an immobile device, the invention is not limited to such devices. For example, some embodiments include two mobile devices. In general, the invention can be practiced using any two devices, regardless as to their mobility or immobility statuses.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method for establishing trusted secure communications from a mobile device to a multi-function device, the method comprising:
    providing, by the multi-function device, a visual pattern encoding a cryptographic key, wherein the visual pattern comprises a dynamic display encoding the cryptographic key in a time domain by a sequence of visually perceptible modulations of a light emitting device, wherein the cryptographic key is an asymmetric key, whereby the mobile device can locally obtains at least one image of the visual pattern, whereby a line-of-sight between the mobile device and the multi-function device is ensured, whereby the mobile device can decodes the visual pattern to obtain the cryptographic key;
    receiving, from the mobile device, a communication comprising at least one datum encrypted using the cryptographic key;
    decrypting the communication to obtain the at least one datum; and
    performing an action based on the communication, wherein the action comprises one selected from the group consisting of: printing a document stored on the mobile device, and scanning a document to the mobile device.

2. The method of claim 1, wherein the providing comprises displaying the visual pattern on a display of the multi-function device.

3. The method of claim 1, wherein the action comprises establishing a secure wireless TCP/IP channel with the mobile device based on the cryptographic key.

4. The method of claim 1, further comprising discarding the cryptographic key at the end of a communication session with the mobile device.

5. A multi-function device configured to establish trusted secure communications from a mobile device, the multi-function device comprising:
    means for displaying a visual pattern encoding a cryptographic key, wherein the means for displaying comprises a dynamic display configured to encode the cryptographic key in a time domain by a sequence of visually perceptible modulations of a light emitting device, wherein the cryptographic key is an asymmetric key, whereby the mobile device can locally obtains at least one image of the visual pattern, whereby a line-of-sight between the mobile device and the multi-function device is ensured, whereby the mobile device can decodes the visual pattern to obtain the cryptographic key;
    an interface configured to receive, from the mobile device, a communication comprising at least one datum encrypted using the cryptographic key;
    at least one processor configured to decrypt the communication to obtain the at least one datum, and
    at least one processor configured to perform an action based on the communication, wherein the action comprises one selected from the group consisting of: printing a document stored on the mobile device, and scanning a document to the mobile device.

6. The multi-function device of claim 5, wherein the means for displaying comprises a display of the multi-function device.

7. The multi-function device of claim 5, further configured to establishing a secure wireless transmission control protocol/internet protocol (TCP/IP) channel with the mobile device based on the cryptographic key.

\* \* \* \* \*